(No Model.)
A. P. ROOT.
TWINE SETTER FOR VINES.
No. 283,516. Patented Aug. 21, 1883.
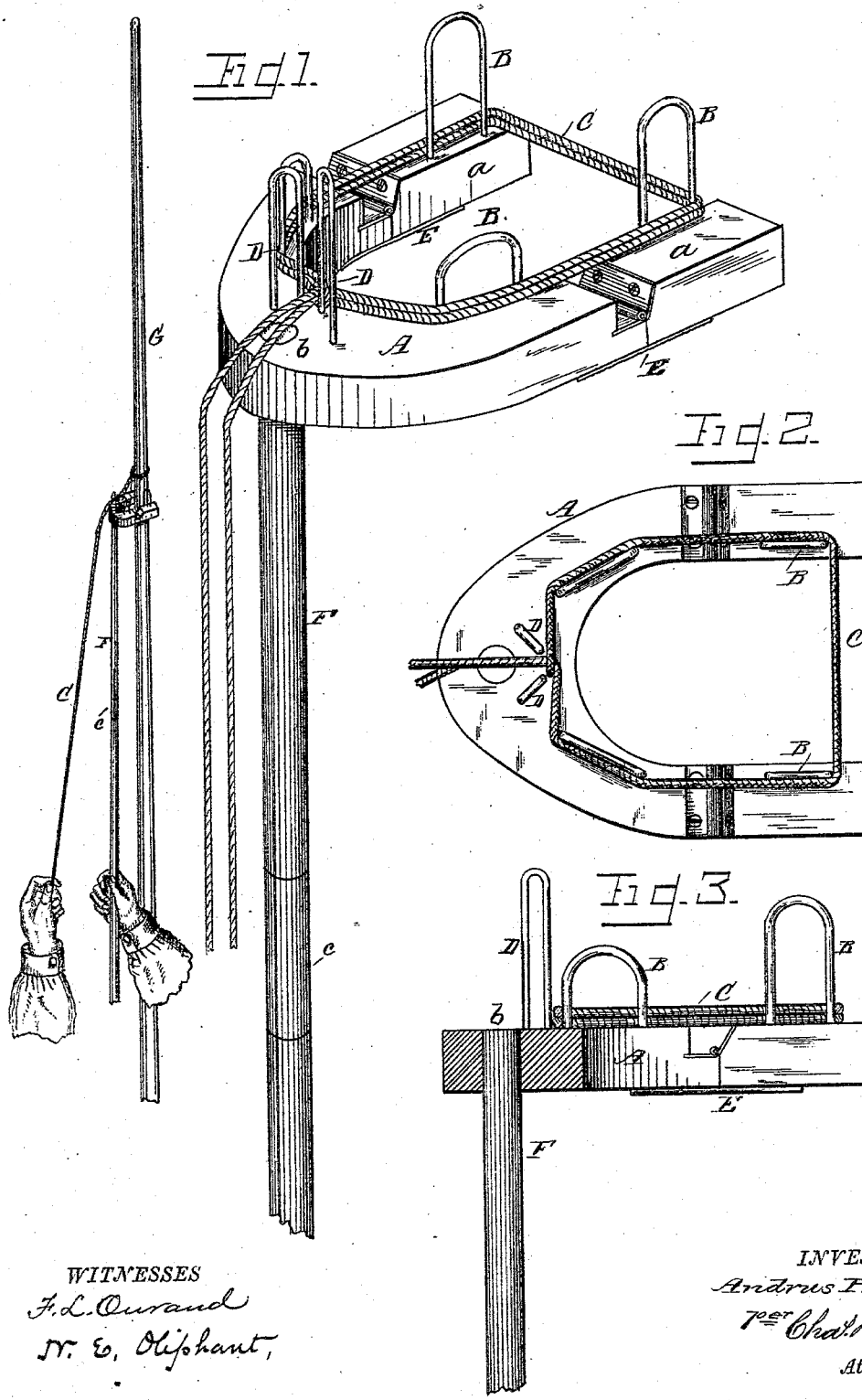
WITNESSES
F. L. Ourand
N. E. Oliphant
INVENTOR
Andrus P. Root
per Chas. H. Fowler
Attorney

UNITED STATES PATENT OFFICE.

ANDRUS P. ROOT, OF DEANSVILLE, NEW YORK.

TWINE-SETTER FOR VINES.

SPECIFICATION forming part of Letters Patent No. 283,516, dated August 21, 1883.

Application filed June 7, 1883. (No model.)

*To all whom it may concern:*

Be it known that I, ANDRUS P. ROOT, a citizen of the United States, residing at Deansville, in the county of Oneida and State of New York, have invented certain new and useful Improvements in Twine-Setters for Vines; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a top plan view, and Fig. 3 a sectional view, of the same.

In the culture of vines, especially hop-vines, it is usual to extend twine from stakes placed in the ground to a center pole, in the form of a tent, and train the vines thereon, said twine or twines being tied to the center pole some distance—say eighteen feet—from the ground, and in the culture of hops the poles are set to the hills in the month of April; but the twines are not placed until the month of May or June. Therefore it is a source of trouble to the growers to properly set or tie the twines to the center poles, as they are either obliged to use a ladder or take down said poles to place the twines in position at a proper height.

The object of the present invention is to provide means whereby the twines may be placed around the standing poles at their base, elevated, and tied at a proper height, thereby doing away with the necessity of using a ladder, which is often dangerous, or removing said poles from the hills after they are planted, it being often impossible to replant them firmly enough to sustain the weight of the vines when grown. These objects I attain by the construction substantially as shown in the accompanying drawings, and hereinafter more fully described.

In the drawings, A represents what I term the "setter," which is preferably of a U shape, with wire loops or other suitable devices, B, projecting from its upper side, around which are placed the twines C, said twines being tied in a slipping noose, with the free ends passed between wire loops D or other suitable devices at the base of the setter.

The ends *a* of the setter are preferably hinged or jointed, and have upon their under sides an elastic webbing or spring, E, connecting with the main portion of the setter, to retain and bring back said ends to their normal position after being operated, though, if desired, the hinges or joints may be dispensed with and the setter made entirely in one piece, of either wood, iron, or other suitable material.

A rod, F, is inserted in or connected to the setter at its base, as shown at *b*, said rod being of any desirable length, and may be extended by socket-joints *c*.

To set or tie the twine upon a standing center pole, as shown at G, Fig. 1, the setter is placed against the pole, at or near its base, within easy reach of the operator, said pole being between the ends *a* of the setter. Beginning at the left, the twine or twines are passed around the outside of the loops or projections B and tied in a slipping noose, with the knot in front, and the free ends passed between the loops or projections D, which form guides. After the twine or twines have thus been placed around the pole the setter is elevated, by means of the rod F, until the desired height is attained, the free ends of said twines passing loosely through the hands during such elevation. After the twines have been raised to the required height the free ends are pulled or drawn toward the operator, when that portion of said twines around the loops or projections B slip off, and the slip-noose being drawn tight the twines are securely fastened to the center pole at the proper elevation, the hinge or joints of the setter's ends *a* facilitating the slipping of the twines from the loops by opening upwardly, though, as before stated, such joints may be omitted.

Having now fully described my invention, what I claim as new, and desire to secure by Letters Patent, is—

1. A twine-setter for vines, constructed substantially as described, whereby the twine or twines may be placed around a standing pole, at or near its base, within easy reach of the operator, and elevated and made fast to said pole at any desired distance thereon, as and for the purpose set forth.

2. The twine-setter herein described, consisting of a U-shaped piece provided upon its upper face with suitable loops or projections, and a rod or handle for elevating said setter to a proper height upon a standing pole, as and for the purpose specified.

3. The U-shaped twine-setter herein described, having its ends hinged or jointed, provided with elastic webbing or suitable springs, said setter having loops or projections upon its upper face, and a suitable handle or rod connected to its base, substantially as and for the purpose described.

In testimony that I claim the above I have hereunto subscribed my name in the presence of two witnesses.

ANDRUS P. ROOT.

Witnesses:
CHAS. T. POOLER,
MARQUIS D. OLDS.